US012113794B2

(12) United States Patent
Alotaibi et al.

(10) Patent No.: US 12,113,794 B2
(45) Date of Patent: Oct. 8, 2024

(54) SYSTEM AND METHOD FOR CONTROLLING LOGIN ACCESS TO COMPUTER RESOURCE ASSETS

(71) Applicant: Saudi Arabian Oil Company, Dhahran (SA)

(72) Inventors: Mohammed Alotaibi, Dammam (SA); Sharjeel Anjum, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 251 days.

(21) Appl. No.: 17/455,311

(22) Filed: Nov. 17, 2021

(65) Prior Publication Data
US 2023/0156008 A1 May 18, 2023

(51) Int. Cl.
H04L 9/40 (2022.01)
(52) U.S. Cl.
CPC ............ *H04L 63/102* (2013.01); *H04L 63/20* (2013.01)
(58) Field of Classification Search
CPC .............................. H04L 63/102; H04L 63/20
See application file for complete search history.

(56) References Cited

U.S. PATENT DOCUMENTS

| 7,373,524 | B2 | 5/2008 | Motsinger et al. |
| 7,779,119 | B2 | 8/2010 | Ginter et al. |
| 8,024,782 | B2 | 9/2011 | Kailash et al. |
| 8,904,506 | B1 * | 12/2014 | Canavor ................. H04L 67/52 713/182 |
| 9,098,689 | B2 | 8/2015 | Gordon et al. |
| 10,142,357 | B1 | 11/2018 | Tamersoy et al. |
| 10,171,484 | B2 | 1/2019 | Balasubramanian et al. |
| 10,270,789 | B2 | 4/2019 | Singh |
| 10,291,630 | B2 | 5/2019 | Saito et al. |

(Continued)

FOREIGN PATENT DOCUMENTS

| EP | 2860937 A1 * | 4/2015 | ............. H04L 29/06 |
| WO | 2007070014 A1 | 6/2007 | |
| WO | WO 2014/145626 A1 * | 9/2014 | ............. G06F 15/16 |

OTHER PUBLICATIONS

Cisco User Security Configuration Guide, Chapter: Cisco IOS Login Enhancements Login Block, Jan. 2018.
(Continued)

*Primary Examiner* — Christopher A Revak
(74) *Attorney, Agent, or Firm* — Leason Ellis LLP

(57) ABSTRACT

A system and method control login access of computer resource assets. The system comprises a computer resource asset and a gateway sub-system. The gateway sub-system has a processor to monitor N login failure conditions of a user, and to control access of the computer resource asset by the user depending on the user meeting the N login failure conditions. The method comprises storing predetermined login information associated with a user, receiving inputted login information from the user at a communication interface, evaluating the inputted login information by a processor configured by software therein, determining a matching or not matching of the predetermined login information, monitoring N login failure conditions of the user, in which N is greater than 1, and controlling access of a computer resource asset by the user depending on the user meeting the N login failure conditions. A method comprises steps performed during operation of the system.

16 Claims, 3 Drawing Sheets

(56) References Cited

U.S. PATENT DOCUMENTS

| | | | |
|---|---|---|---|
| 10,397,249 B2 | 8/2019 | Gurkok et al. | |
| 2002/0194507 A1* | 12/2002 | Kanzawa | H04L 63/20 |
| | | | 709/224 |
| 2004/0162982 A1* | 8/2004 | Komai | G06F 21/31 |
| | | | 713/168 |
| 2005/0144263 A1* | 6/2005 | Shiba | H04L 63/102 |
| | | | 709/221 |
| 2006/0277301 A1* | 12/2006 | Takanashi | G06F 21/78 |
| | | | 709/225 |
| 2017/0104771 A1 | 4/2017 | Saito et al. | |
| 2017/0134362 A1* | 5/2017 | Randall | H04L 63/083 |
| 2018/0145985 A1* | 5/2018 | Pham | H04L 63/10 |
| 2019/0190934 A1 | 6/2019 | Peppe | |
| 2020/0267178 A1 | 8/2020 | Maor et al. | |
| 2020/0389499 A1 | 12/2020 | Koval et al. | |
| 2021/0124746 A1 | 4/2021 | Klaedtke | |
| 2022/0166788 A1* | 5/2022 | Grammel | G06F 21/552 |

OTHER PUBLICATIONS

Office Action in corresponding Saudi Arabian Application No. 122440628, mailed Oct. 26, 2023; 15 pages.

* cited by examiner

SYSTEM AND METHOD FOR CONTROLLING LOGIN ACCESS TO COMPUTER RESOURCE ASSETS

FIELD OF THE DISCLOSURE

The present disclosure relates generally to access of computer resource assets, and, more particularly, to a system and method for controlling login access of computer resource assets.

BACKGROUND OF THE DISCLOSURE

Access to computer resource assets on a network can be mediated by implementing at least a login name and a password, with such a login name and password associated with an account of a user. However, malicious actors and bots can attempt to access the network and its computer resource assets using a password spraying attack. Such password spraying attacks are brute-force attacks, by which the malicious actor attempts to enter the same password on different number of accounts before moving on to another password and repeating the process.

SUMMARY OF THE DISCLOSURE

According to an embodiment consistent with the present disclosure, a system and method control login access of computer resource assets.

In an embodiment, a system comprises a computer resource asset and a gateway sub-system. The gateway sub-system has a processor configured by software therein to monitor N login failure conditions of a user, in which N is greater than 1, and to control access of the computer resource asset by the user depending on the user meeting the N login failure conditions. The N login failure conditions include a first login failure condition being $L_1$ login attempts by the user within $T_1$ seconds without success, and at least an Nth login failure condition being $L_N$ login attempts by the user within $T_N$ seconds without success.

The first login failure condition includes 5 login attempts by the user within 15 seconds without success, and the Nth login failure conditions includes a second login failure condition being 7 login attempts by the user within 30 seconds without success, a third login failure condition being 8 login attempts by the user within 45 seconds without success, and a fourth login failure condition being 10 login attempts by the user within 60 seconds without success. Each of the N login failure conditions includes a predetermined number $L_N$ of login attempts by the user over a predetermined period of time $T_N$. When the gateway sub-system detects a successful login attempt by the user at any time, the gateway sub-system grants the user access to the computer resource asset. When the gateway sub-system detects that the user meets the N login failure conditions, the gateway sub-system blocks the user from accessing the computer resource asset. When the gateway sub-system blocks the user, the gateway sub-system sends an alert of the blocking to an administrator. $L_N$ can be greater than $L_1$. $T_N$ can be greater than $T_1$.

In another embodiment, a gateway sub-system comprises a memory, a communication interface, and a processor. The memory is configured to store predetermined login information associated with a user. The communication interface is configured to receive inputted login information from the user. The processor is configured by software therein to evaluate the inputted login information as matching or not matching the predetermined login information, to monitor N login failure conditions of the user, in which N is greater than 1, and to control access of a computer resource asset by the user depending on the user meeting the N login failure conditions. The N login failure conditions include a first login failure condition being $L_1$ login attempts by the user within $T_1$ seconds without success, and at least an Nth login failure condition being $L_N$ login attempts by the user within $T_N$ seconds without success.

The first login failure condition includes 5 login attempts by the user within 15 seconds without success. The Nth login failure conditions includes a second login failure condition being 7 login attempts by the user within 30 seconds without success, a third login failure condition being 8 login attempts by the user within 45 seconds without success, and a fourth login failure condition being 10 login attempts by the user within 60 seconds without success. When the processor detects a successful login attempt by the user at any time, the processor grants the user access to the computer resource asset.

In a further embodiment, a method comprises storing predetermined login information associated with a user in a memory, receiving inputted login information from the user at a communication interface, evaluating the inputted login information by a processor configured by software therein, determining a matching or not matching of the predetermined login information, monitoring N login failure conditions of the user, in which N is greater than 1, and controlling access of a computer resource asset by the user depending on the user meeting the N login failure conditions. The N login failure conditions a first login failure condition being 5 login attempts by the user within 15 seconds without success, a second failure condition being 7 login attempts by the user within 30 seconds without success, a third login failure condition being 8 login attempts by the user within 45 seconds without success, and a fourth login failure condition being 10 login attempts by the user within 60 seconds without success. When the processor detects that the user meets the N login failure conditions, the processor blocks the user from accessing the computer resource asset. When the processor blocks the user, the processor sends an alert of the blocking through the communication interface to an administrator.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method for controlling login access of computer resource assets.

Figure 1:
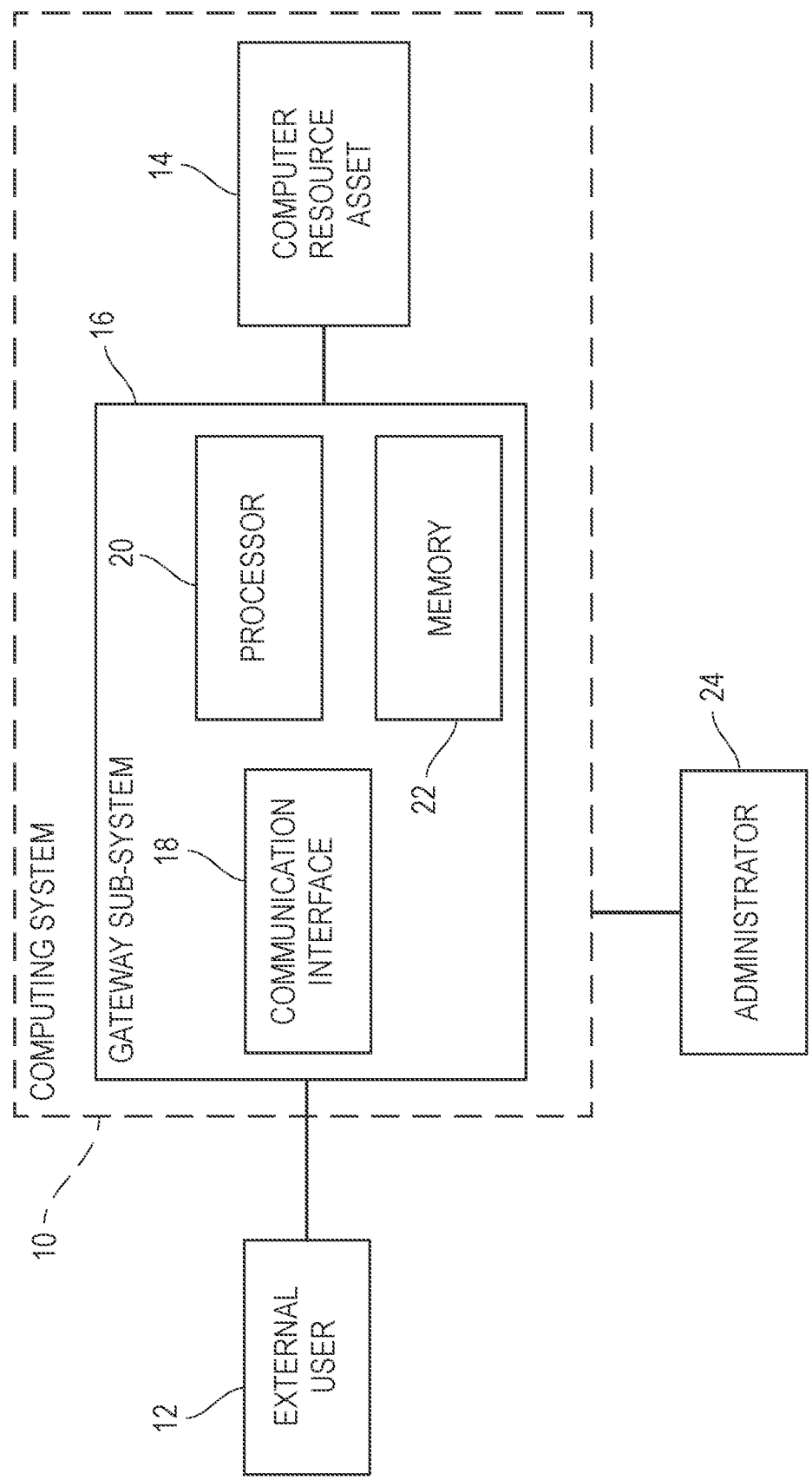
FIG. 1 is a schematic of a system, according to an embodiment.

Referring to FIG. 1, a computer system 10 controls access of an external user 12 to a computer resource asset 14. The computer resource asset 14 can be a computer file, a computer directory, computing software, computing hardware, a computer-based service, etc. The computer resource asset 14 can be stored and maintained on a network. The network can be an external network of a company accessible through a dedicated network environment. The access to the computer resource asset 14 is controlled by a gateway sub-system 16. The gateway sub-system 16 allows or blocks access of the external user 12 to the computer resource asset 14. The gateway sub-system 16 includes a communication interface 18, a hardware processor 20, and a memory 22. The hardware processor 20 has code therein configured to monitor access or login attempts by the external user 12. The memory 22 is configured to store predetermined login information associated with all authorized users.

The hardware processor 20 generates a log of activity which is stored in the memory 22 and which is accessible by an administrator 24. The administrator 24 can access and view the log of activity through the communication interface 18 using any known type of input/output device. For example, the input/output device can include a keyboard, a mouse, a display, and a graphical user interface (GUI). In one embodiment, the log of activity includes a record of attempts by specific external users 12 to login and access specific computer resource assets 14. The record of attempts can include the number of attempts, the duration of time in which the number of attempts occur, the success of the attempts, and the failure of the attempts. The hardware processor 20 generates an alert of a specific external user 12 being blocked from access to a specific computer resource asset 14. The alert is stored and available to various resources within the computer system 10. The computing system 10 sends the alert to the administrator 24. The administrator 24 receives the alert through the output device, such as a display.

Figure 2:
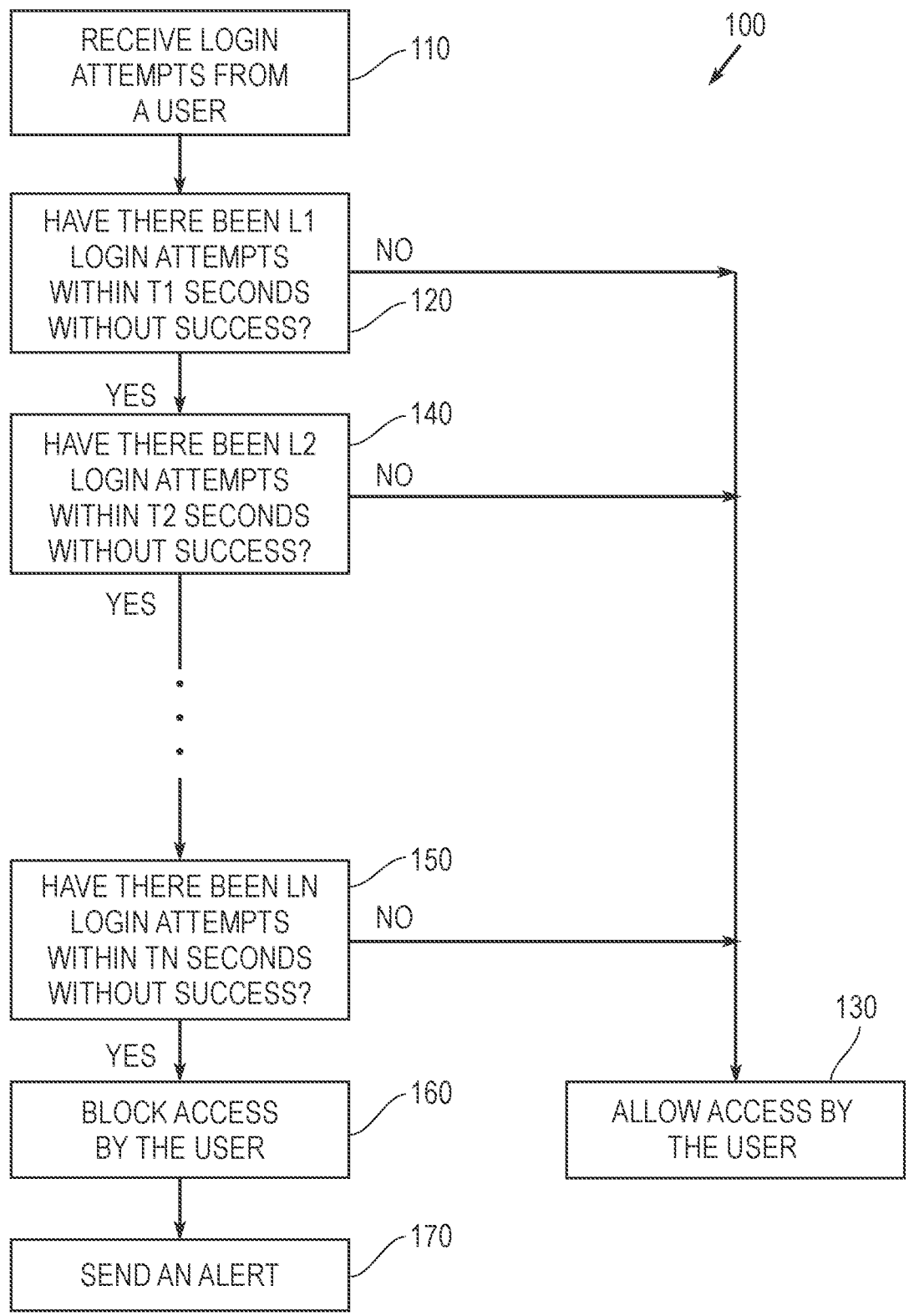
FIG. 2 is a flowchart of a method of operation of the system of FIG. 1.

As shown in FIG. 2, a method 100 of operation of the system 10 includes the step 110 of receiving login attempts from a user. The login attempts can include entry by the user of a login name and a password through an input device. The method 100 then checks if there have been $L_1$ login attempts within $T_1$ seconds without success in step 120. If not, the method 100 allows access by the user in step 130. Otherwise, the method 100 then checks if there have been $L_2$ login attempts within $T_2$ seconds without success in step 140. If not, the method 100 allows access by the user in step 130. Otherwise, the method 100 then checks if there have been $L_N$ login attempts within $T_N$ seconds without success in step 150, in which N is greater than or equal to 2 and is a value which is stored securely within the computer system 10. If not, the method 100 allows access by the user in step 130. Otherwise, the method 100 blocks access by the user in step 160, and generates and sends an alert to the administrator 24 in step 170.

The administrator 24 can customize the stored value of N, with N greater than or equal to 2. In addition, the administrator 24 can customize the values of $L_1, L_2, \ldots L_N$, in which $L_1 < L_2 < \ldots < L_N$, all of which are stored on a resource within the computer system 10. The administrator 24 can further customize the values of $T_1, T_2, \ldots T_N$, in which $T_1 < T_2 < \ldots < T_N$, all of which are likewise stored on a resource within the computer system 10. For example, the administrator 24 can enter the various values through an input device, such as a keyboard, a mouse, and a GUI, as described above, with that value saved in a memory, record, or a database, as three non-limiting examples.

Figure 3:
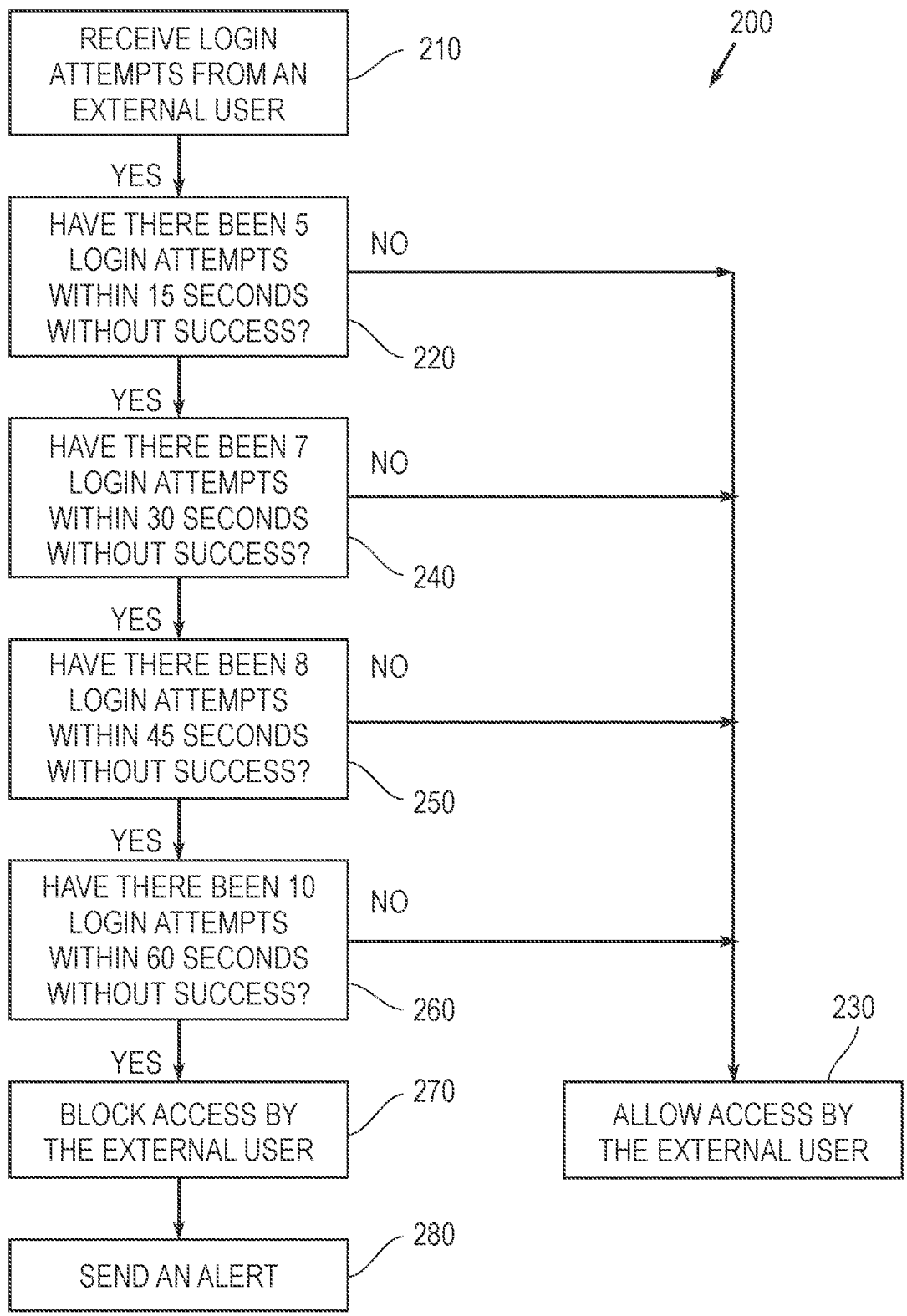
FIG. 3 is a flowchart of the method of FIG. 2 applied to a specific embodiment.

As shown in FIG. 3, in a specific embodiment, a method 200 of operation of the system 10 includes the step 210 of receiving login attempts from an external user 12. The login attempts can include entry by the external user 12 of a login name and a password through an input device. The method 200 then checks if there have been 5 login attempts within 15 seconds without success in step 220 by examining the content of the log of activity. If not, the method 200 allows access by the user in step 230. Otherwise, the method 200 then checks if there have been 7 login attempts within 30 seconds without success in step 240, again, by checking the log of activity (and in this way for each time a check is made). If not, the method 100 allows access by the user in step 230. Otherwise, the method 200 then checks if there have been 8 login attempts within 45 seconds without success in step 250. If not, the method 200 allows access by the user in step 230. Otherwise, the method 200 then checks if there have been 10 login attempts within 60 seconds without success in step 260. If not, the method 200 allows access by the user in step 230. Otherwise, the method 200 blocks access by the external user 12 in step 270, and generates and sends an alert to the administrator 24 in step 280.

Portions of the methods described herein can be performed by software or firmware in machine readable form on a tangible (e.g., non-transitory) storage medium. For example, the software or firmware can be in the form of a computer program including computer program code adapted to cause the system 10 to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system, comprising:
a computer resource asset; and
a gateway sub-system having a processor configured by software therein to monitor at least one login attempt by a user, up to N progressive login attempts being N login failure conditions of the user, in which N is greater than 1, and to control access of the computer resource asset by the user depending on the user meeting the N login failure conditions,
wherein the N login failure conditions include:
a first login failure condition of the user being $L_1$ login attempts by the user within $T_1$ seconds without success;
at least an Nth login failure condition of the user subsequent to and distinct from the first login failure condition, wherein the at least an Nth login failure condition consists of $L_N$ login attempts by the user within $T_N$ seconds without success,
wherein in the case that the gateway sub-system detects a successful login attempt by the user at any time during the at least one login attempt, the gateway sub-system controls access by granting the user access to the computer resource asset, and
wherein in the case that the gateway sub-system detects that the user meets all of the N login failure conditions during the N progressive login attempts, the gateway sub-system controls access by blocking the user from accessing the computer resource asset.

2. The system of claim 1, wherein the first login failure condition includes 5 login attempts by the user within 15 seconds without success.

3. The system of claim 2, wherein the Nth login failure conditions include:
a second login failure condition being 7 login attempts by the user within 30 seconds without success.

4. The system of claim 3, wherein the Nth login failure conditions include:
a third login failure condition being 8 login attempts by the user within 45 seconds without success.

5. The system of claim 4, wherein the Nth login failure conditions include:
a fourth login failure condition being 10 login attempts by the user within 60 seconds without success.

6. The system of claim 1, wherein each of the N login failure conditions include a predetermined number $L_N$ of login attempts by the user over a predetermined period of time $T_N$.

7. The system of claim 1, wherein in the case that the gateway sub-system blocks the user, the gateway sub-system sends an alert of the blocking to an administrator.

8. The system of claim 1, wherein $L_N$ is greater than $L_1$.

9. The system of claim 1, wherein $T_N$ is greater than $T_1$.

10. A gateway sub-system, comprising:
a memory configured to store predetermined login information associated with a user;
a communication interface configured to receive inputted login information from the user; and
a processor configured by software therein to evaluate the inputted login information as matching or not matching the predetermined login information, to monitor at least one login attempt by the user, up to N progressive login attempts being N login failure conditions of the user from the matching or not matching evaluation, in which N is greater than 1, and to control access of a computer resource asset by the user depending on the user meeting the N login failure conditions,
wherein the N login failure conditions include:
a first login failure condition of the user being $L_1$ login attempts by the user within $T_1$ seconds without success;
at least an Nth login failure condition of the user subsequent to and distinct from the first login failure condition, wherein the at least an Nth login failure condition consists of $L_N$ login attempts by the user within $T_N$ seconds without success,
wherein in the case that the gateway sub-system detects a successful login attempt by the user at any time during the at least one login attempt, the gateway sub-system controls access by granting the user access to the computer resource asset, and
wherein in the case that the gateway sub-system detects that the user meets all of the N login failure conditions during the N progressive login attempts, the gateway sub-system controls access by blocking the user from accessing the computer resource asset.

11. The gateway sub-system of claim 10, wherein the first login failure condition includes 5 login attempts by the user within 15 seconds without success.

12. The gateway sub-system of claim 11, wherein the Nth login failure conditions include:
a second login failure condition being 7 login attempts by the user within 30 seconds without success.

13. The gateway sub-system of claim 12, wherein the Nth login failure conditions include:
a third login failure condition being 8 login attempts by the user within 45 seconds without success.

14. The gateway sub-system of claim 13, wherein the Nth login failure conditions include:
a fourth login failure condition being 10 login attempts by the user within 60 seconds without success.

15. A method, comprising:
storing, in a memory, predetermined login information associated with a user;

receiving inputted login information from the user at a communication interface;

evaluating the inputted login information by a processor configured by software therein to be at least one login attempt by the user, up to N progressive login attempts, in which N is greater than 1;

determining a matching or not matching of the inputted login information with the predetermined login information;

monitoring N login failure conditions of the user from the matching or not matching determination, in which N is greater than 1; and controlling access of a computer resource asset by the user depending on the user meeting the N login failure conditions, wherein the controlling includes:

responsive to detecting a successful login attempt by the user at any time during the at least one login attempt, granting the user access to the computer resource asset, and responsive to detecting that the user meets any of the N login failure conditions during the N progressive login attempts, blocking the user from accessing the computer resource asset, wherein the N login failure conditions of the user include:

a first login failure condition of the user being 5 login attempts by the user within 15 seconds without success;

a second failure condition of the user subsequent to and distinct from the first login failure condition, wherein the second failure condition consists of 7 login attempts by the user within 30 seconds without success;

a third login failure condition of the user subsequent to and distinct from the second login failure condition, wherein the third failure condition consists of 8 login attempts by the user within 45 seconds without success; and a fourth login failure condition of the user subsequent to and distinct from the third login failure condition, wherein the fourth failure condition consists of 10 login attempts by the user within 60 seconds without success.

16. The method of claim 15, further comprising:

wherein in the case that the processor blocks the user, sending an alert of the blocking through the communication interface to an administrator.

* * * * *